(12) United States Patent
Eisgruber et al.

(10) Patent No.: US 7,897,136 B2
(45) Date of Patent: *Mar. 1, 2011

(54) METHOD FOR THE PRODUCTION OF HYDROTALCITES

(75) Inventors: Max Eisgruber, Bruckberg (DE); Jürgen Ladebeck, Louisville, KY (US); Jürgen Koy, Grosskarolinenfeld (DE); Hubert Schiessling, Landshut (DE); Wolfgang Buckl, Hörgertshausen (DE); Herrmann Ebert, Landshut (DE)

(73) Assignee: Sud-Chemie AG, Munich (DE)

( * ) Notice: Subject to any disclaimer, the term of this patent is extended or adjusted under 35 U.S.C. 154(b) by 799 days.

This patent is subject to a terminal disclaimer.

(21) Appl. No.: 11/741,847

(22) Filed: Apr. 30, 2007

(65) Prior Publication Data

US 2007/0231243 A1 Oct. 4, 2007

Related U.S. Application Data

(62) Division of application No. 10/475,243, filed on Jan. 14, 2004, now Pat. No. 7,211,235.

(51) Int. Cl.
*C07F 11/00* (2006.01)

(52) U.S. Cl. .............................. 423/593.1; 423/594.16; 423/594.14; 423/599; 423/594.5; 423/594.3; 423/594.1; 423/595; 423/263; 423/600

(58) Field of Classification Search ............... 423/600, 423/263, 593.1, 594.16, 595, 599, 594.14, 423/594.5, 594.3, 594.1
See application file for complete search history.

(56) References Cited

U.S. PATENT DOCUMENTS

| | | |
|---|---|---|
| 3,796,792 A | 3/1974 | Myata |
| 3,928,236 A | 12/1975 | Rigge |
| 4,065,407 A | 12/1977 | Bambrick |
| 4,119,474 A | 10/1978 | Whitman |
| 4,120,826 A | 10/1978 | Ebel |
| 4,120,942 A | 10/1978 | Spitzer |
| 4,169,874 A | 10/1979 | Bambrick |
| 4,180,411 A | 12/1979 | Whitman |
| 4,411,771 A | 10/1983 | Bambrick |
| 4,539,195 A | 9/1985 | Schanz |
| 4,560,545 A | 12/1985 | Spickett |
| 4,605,484 A | 8/1986 | Shiroki |
| 5,110,992 A | 5/1992 | Atkins |
| 5,250,279 A | 10/1993 | Preston |
| 5,260,492 A | 11/1993 | Feiring |
| 5,399,329 A | 3/1995 | Schutz |
| 5,578,286 A | 11/1996 | Martin |
| 5,728,363 A | 3/1998 | Martin |
| 5,728,364 A | 3/1998 | Martin |
| 5,728,365 A | 3/1998 | Martin |
| 5,728,366 A | 3/1998 | Martin |
| 5,730,951 A | 3/1998 | Martin |
| 5,776,424 A | 7/1998 | Martin |
| 6,248,817 B1 | 6/2001 | Takado |
| 7,211,235 B2 * | 5/2007 | Eisgruber et al. ........ 423/420.2 |

FOREIGN PATENT DOCUMENTS

| | | |
|---|---|---|
| WO | WO9322237 A1 | 11/1993 |
| WO | WO9605140 A1 | 2/1996 |
| WO | WO0112550 A1 | 2/2001 |
| WO | WO0112570 A1 | 2/2001 |

OTHER PUBLICATIONS

Cavani, F., et al, "Hydrotalcite-type Anionic Clays: Preparation, Properties and Applications", Catalysis Today, 11 (1991), pp. 173-301.

Figusch, V., et al., "Synthesis of spinel-magnesia ceramics from finely milled mixtures of magnesite MgCO3 and gibbsite Al(OH)3", Proceedings of the 1st International Conference on Mechanochemistry, pp. 81-85.

Isupov, V.P., et al., "Mechanochemical Synthesis of Double Hydroxides", Journal of Materials Synthesis and Processing, vol. 8, Nos. 3/4 (2000), pp. 251-253.

Ueno, S., et al., "Hydrotalcite catalysis: heterogeneous epoxidation of olefins using hydrogen peroxide in the presence of nitriles", Chem. Commun., 1998, pp. 295-296.

* cited by examiner

*Primary Examiner*—Steven Bos
(74) *Attorney, Agent, or Firm*—Scott R. Cox

(57) ABSTRACT

A method is described for the manufacture of hydrotalcites by using at least one compound of a bivalent metal (Component A) and at least one compound of a trivalent metal (Component B), wherein at least one of these components is not used in the form of a solution, characterized in that a) at least one of the Components A and/or B which is not used in the form of a solution, shortly before or during mixing of the components, and/or b) the mixture containing the Components A and B is subjected to intensive grinding until an average particle size ($D_{50}$) in the range of approx. 0.1 to 5 μm is obtained, and optionally, after aging treatment or hydrothermal treatment, the resulting hydrotalcite product is separated, dried, and optionally calcinated.

Figure 1:
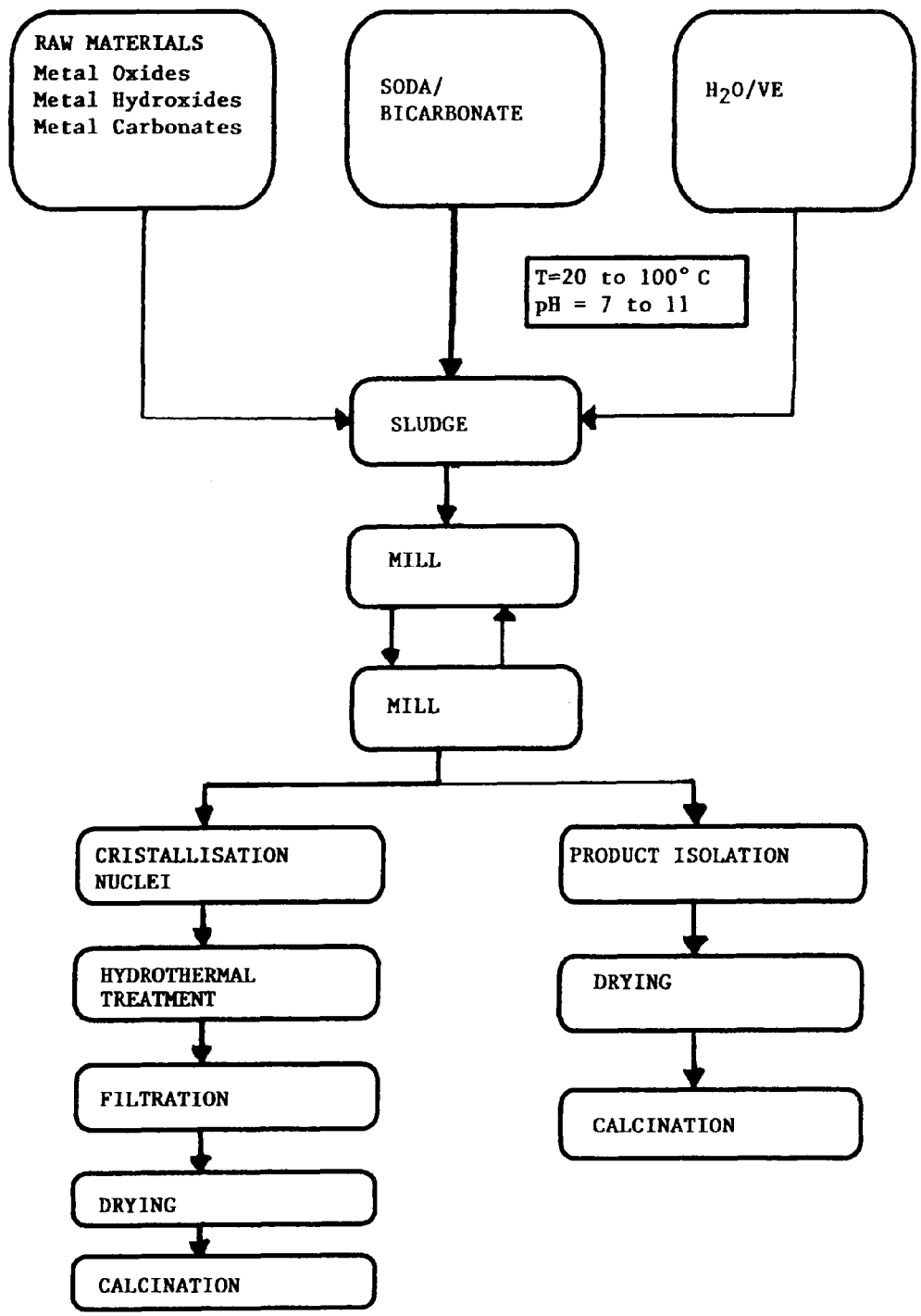

The hydrotalcite precursors and/or fine-particle crystalline hydrotalcites which can be obtained by using the method in accordance with this present invention may be used in particular as catalysts or catalyst carriers or as nanocomposite filling agents or co-stabilizers in a polymer matrix.

24 Claims, 2 Drawing Sheets

METHOD FOR THE PRODUCTION OF HYDROTALCITES

CROSS REFERENCE TO RELATED APPLICATIONS

This application is a divisional application of application Ser. No. 10/475,243, filed on Jan. 14, 2004 which issued as U.S. Pat. No. 7,211,235 on May 1, 2007.

BACKGROUND

This present invention concerns a procedure for the production of hydrotalcites from compounds of bivalent and trivalent metals.

Hydrotalcite as it occurs in nature is derived from the mineral brucite and has the following ideal formula:

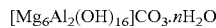

$[Mg_6Al_2(OH)_{16}]CO_3 \cdot nH_2O$

In hydrotalcite, some magnesium ions have been replaced by aluminum ions, as a result of which the individual layer receives a positive charge. This is compensated by carbonate anions which, together with crystal water, are located in the intermediate layers.

In synthetic hydrotalcites, magnesium may have been substituted, whether as whole or in part, by zinc, calcium, iron (II), cobalt, copper, cadmium, nickel and/or manganese, and aluminum may have been substituted, whether as a whole or in part, by iron(III), boron, manganese, bismuth and/or cerium.

The pertinent literature basically described three different methods for the synthesis of hydrotalcites:

The oldest method refers to the coprecipitation of solutions of bivalent and trivalent metals in the presence of an anion. The pH value is either kept constant or set to neutral to slightly basic values, starting initially either in the highly acidic or in the highly basic range. This step is followed by hydrothermal treatment. This method works for virtually all hydrotalcites which can be produced. A summary of such coprecipitation synthesis can be found in "Catalysis Today" 11 (2), (1991), pages 173 through 301, in particular on pages 201 through 212. These procedures are limited in terms of their technical application since, in part, they require a certain quality of raw materials (cost of raw materials) and a pretreatment of the raw materials (duration of synthesis) and require very complicated equipment. In addition, during the conversion, as byproducts, soluble salt, such as sodium chloride, are formed which must be rinsed out of either the precipitation of the precursor product or from the final product, which requires larger quantities of cleaning water and increases the salt content of the waste water. The most common and cheapest soluble salts include the metal chlorides. In the different system parts, chlorides cause heavy corrosion. System parts which come into contact with such raw materials must be designed to withstand the same. Generally speaking, only titanium equipment or coatings are suitable for this purpose, which makes the system equipment very costly.

The salt-oxide method describes the conversion of a metal salt with the oxide or hydroxide of the other metal. By using acids or bases, the pH vale is ultimately set to an optimal value. Usually, this value is in the neutral to slightly basic range. For example, MgO can be converted to hydrotalcite by using $AlCl_3$. By selecting suitable raw materials, this results in cost savings compared with the coprecipitation method, considering that oxides are generally less costly than soluble salts, and the waste water also contains less salts. One of the disadvantages of this method is that the manufacture of pure-phase products is very difficult.

The third method refers to the conversion of the oxides, hydroxides or carbonates of the bivalent or trivalent metals. The patent literature, e.g. DE 20 61 114, U.S. Pat. No. 5,399,329 as well as U.S. Pat. No. 5,578,286, contains examples for such method. In addition to relatively low raw material costs, the waste water has a relatively low salt content.

Among other things, WO 01/12570 describes the manufacture of an abrasion-resistant formed body containing crystalline anionic clay by mixing MgO with gibbsite or amorphous alumina gel. This patent application furthermore describes optional homogenization of the slurry. This is follow by calcination, resuspension, and aging of the molded bodies.

In summary, in case inexpensive raw materials are used, so far, it has been impossible to achieve a high and constant product quality. Consequently, prior art products therefore exhibit the following major disadvantages:

High cost of raw materials used: soluble salts are offered in the form of solutions (e.g. as a $MgCl_2$ solution or as an $AlCl_3$ solution) or solids. Solid products of soluble salts are more expensive than their solutions and can not be used for economical reasons. Because of the generally higher content of anions, their metal content is low (e.g. $MgCl_2 \cdot 5H_2O$: approx. Mg content=11%). Insofar as oxides or hydroxides of the metals are planned to be used, they must be highly reactive to ensure successful conversion. This, in turn, leads to high raw material costs.

One goal in the planning of new systems is the efficient utilization of resources and minimal environmental impact. In case salt solutions are used, the transportation costs are unreasonably high because of the relatively low content of active ingredients. The anion parts which are not incorporated in the product are discharged into the waste water system.

In accordance with prior art methods, raw materials which are as active as possible are used, in particular in case suspensions of solids are planned to be used. The storability of active raw materials is limited.

In a system, the handling of active raw materials is more difficult. Processing these active raw materials is also problematic because their reactivity greatly change as a result of different storage times in the system. As a result, the final product (hydrotalcite) is subject to significant fluctuations in quality. For example, MgO binds in water while producing a significant amount of heat. In the case of prolonged storage times or in the event of system malfunctions, an aqueous MgO suspension therefore represents a safety risk. MgO is particularly difficult to handle as an active raw material. Active species should be used as suspensions with a low content of solids. In case excessively diluted suspensions are used, however, the cost of the preparations increases, considering that larger volumes need to be treated (boiler size, pumping assemblies, stirring elements).

Another problem arises, for example, in case aluminum is used in the form of inexpensive and highly available aluminate solutions. They are stabilized by using sugar derivatives to ensure that, during storage, no crystallization of $Al(OH)_3$ takes place. The sugars are not incorporated in the product and are discharged into the waste water. This increases the CSB value beyond the permissible threshold values. Cheaper qualities of sodium aluminate solutions have varying contents of active substance.

On the other hand, in case less reactive raw materials are used, it is not possible to manufacture hydrotalcite with a high degree of phase purity. Phases of initial substances can be detected, or other phases, which are indicative of incomplete conversion of the raw materials. The quality of the hydrotalcites obtained is frequently insufficient for specific applications, such as e.g. as a PVC stabilizing agent.

The object of this present invention was therefore to provide a method for the manufacture of hydrotalcites which permits the advantageous use of inexpensive and environmentally harmless initial materials in the production of hydrotalcites and which overcomes the above-described drawbacks of state-of-the-art methods while still supplying high-quality hydrotalcites.

This is achieved by the method as disclosed in claim 1 hereof. Preferred embodiments of this method are detailed in the sub claims.

Surprisingly, a method was discovered to manufacture hydrotalcites by using at least one compound of a bivalent metal (Component A) and at least one compound of a trivalent metal (Component B), wherein at least one of the above components is not used in the form of a solution, characterized in that a) at least one of the Components A or B which is not used in the form of a solution, shortly before or during mixing of the components, and/or b) the mixture of the Components A and B is subjected to intensive grinding until an average particle size ($D_{50}$) of approx. 0.1 to 5 μm, in particular approx. 0.5 to 5 μm, preferably 1 to 5 μm, and optionally, after aging treatment or hydrothermal treatment, the resulting hydrotalcite product is separated and dried. The average particle size ($D_{50}$ value, i.e. 50% of the existing particles are smaller than the specified particle size) after intensive grinding can, in a preferred embodiment hereof, also be 3 μm or smaller, in particular 2 μm or smaller.

Preferably, the $D_{90}$ value (meaning that 90% of the existing particles are smaller than the specified particle size) after intensive grinding is between 1 and 5 μm or smaller, in particular between 1 and 4 μm, and particularly preferably between 1.5 and 3 μm.

For the purposes of this present invention, the term "hydrotalcite" refers to a double-layer hydroxide compound with the following general formula:

$$A_w B_x (OH)_y C_z \cdot nH_2O$$

wherein A represents a bivalent metal cation, B a trivalent metal cation, and C a monovalent or plurivalent anion and for w, x, y, z, and n, the following conditions apply: $0 < z \leq x \leq 4 \leq w \leq \frac{1}{2} \leq y$ and $12 \geq n \geq 0$.

This also covers compounds with the formula $A_6B_2(OH)_{16}Cz.4H_2O$, wherein A is either $Mg^{2+}$, $Fe^{2+}$, and $Zn^{2+}$, B is either $Al^{3+}$, $Fe^{3+}$, and $Cr^{3+}$, and C is selected from a group of anions containing $OH^-$, $Cl^-$, $Br^-$, $CH_3COO^-$, $CO_3^{2-}$, $SO_4^{2-}$, $PO_4^{3-}$, $Fe(CN)_6^{4-}$ and some borates, carboxylates, and polyoxymetalates, wherein $\frac{1}{2} \leq z \leq 2$ (depending on the charge of the substituted anions).

Preferred embodiments of this present invention refer to the compounds derived from the formula $Mg_6Al_2(OH)_{16}]CO_3.nH_2O$ specified above. Compared with brucite, in hydrotalcite, some magnesium ions have been substituted by aluminum ions, as a result of which the individual layer receives a positive charge. This is compensated by carbonate anions which, together with crystal water, are located in the intermediate layers. In synthetic hydrotalcites, magnesium may have been substituted, whether as whole or in part, by zinc, calcium, iron (II), cobalt, copper, cadmium, nickel and/or manganese, and aluminum may have been substituted, whether as a whole or in part, by iron (III), boron, manganese, bismuth and/or cerium. In the hydrotalcites in accordance with this present invention, the carbonate that is primarily present in the intermediate layers may afterwards be substituted, whether as a whole or in part, by one or several of the above anions, including by anions with organic radicals.

This present invention makes it possible to advantageously use inactive standard raw materials which are inexpensive and readily available on the market to produce high-quality hydrotalcites. In particular, the hydrotalcites manufactured in accordance with this present invention have a phase purity of >90%, in particular >95%, particularly preferably >98%, as determined by using the ASTM C 1365-98 method. The process is safe and only has a very minor impact on the environment (in particular the waste water).

In addition, the procedure in accordance with this present invention permits the manufacture of fine-particle, powdery hydrotalcites, in particular with an average particle size ($D_{50}$) in the range from 0.1 and 2 μm, in particular between 0.1 and 1 μm, and particularly preferably between 0.5 and 1 μm.

The term "inactive raw materials" refers to raw materials that are insoluble, i.e. the solubility of the reaction medium and/or solvent used, preferably water, at 25° C. and at a pH value of 6 to 7, is less than $5 \times 10^{-8}$, in particular less than $1 \times 10^{-9}$, and particularly preferably less than $5 \times 10^{-10}$. The BET surface (DIN 66123) of such materials is generally less than 30 m²/g, preferably less than 10 m²/g, in particularly less than approx. 6 m²/g. Such products are relatively stable during storage, easier to handle and generally less expensive than active products. Surprisingly, such inactive raw materials can be activated inexpensively through intensive grinding and converted to a high-quality hydrotalcite. Examples for such inactive raw materials are oxides, hydroxides, and carbonates of bivalent and trivalent metals, preferably of magnesium and zinc, wherein the term "carbonates" refers to both neutral carbonates (e.g. $MgCO_3$) as well as basic carbonates (such as magnesia alba and/or bicarbonates [e.g. $Mg(HCO_3)_2$]). The oxides of zinc and the oxides of aluminum are particularly preferred.

These insoluble (inactive) raw materials (Components A and/or B which are not used in the form of a solution) are preferably used in the form of a suspension.

In accordance with this present invention, at least one source of bivalent metal and at least one source of a trivalent metal is used. One or several compounds each can be used, and different bivalent and/or trivalent metals can be contained therein.

Preferred bivalent metals include, but are not limited to $Mg^{2+}$, $Ca^{2+}$, $Zn^{2+}$, $Mn^{2+}$, $Co^{2+}$, $Ni^{2+}$, $Fe^{2+}$, $Sr^{2+}$, $Ba^{2+}$ and/or $Cu^{2+}$.

Preferred trivalent metals include, but are not limited to $Al^{3+}$, $Mn^{3+}$, $Co^{3+}$, $Ni^{3+}$, $Cr^{3+}$, $Fe^{3+}$, $Ga^{3+}$, $Sc^{3+}$, $B^{3+}$ and/or trivalent cations of rare earth metals.

Intensive grinding greatly increases the reactibility of the compounds of bivalent and trivalent metals that are not used in the form of a solution, in particular that of the above-mentioned inactive raw materials, such as insoluble carbonates, oxides, and/or hydroxides of the bivalent metals and/or the oxides and hydroxides of the trivalent metals, which permits surprisingly good hydrotalcite conversions and qualities. In the process, it was surprisingly found that, to achieve particularly good results, intensive grinding should be performed in such a manner that an average particle size ($D_{50}$) in the approximate range from 0.1 and 5 μm, in particular between 0.4 and 2 μm, and particularly preferably between 0.4 and 1.1 μm is obtained. The preferred $D_{90}$ values are between 1 and 10 μm, in particular between 1 and 5 μm, and particularly preferably between 1.5 and 2.5 μm. Considering that, usually, the initial average particle size of the raw materials is significantly higher than after intensive grinding, the intensive grinding process in accordance with this present invention produces significantly smaller particles, usually by at least approx. 30%, rather than merely leading to homogenization and/or mixing of the suspension.

It is assumed that the intensely ground particles exhibit a particularly advantageous surface/volume ratio which favors subsequent conversion to high-quality hydrotalcite. Ultimately, a high-quality, fine-particle hydrotalcite is obtained which, for example, is particularly suited for use as a plastic additive. For this application, hydrotalcites with an average particle size ($D_{50}$) of less than approx. 1 µm and a $D_{90}$ value of no more than 2 to 3 µm are preferred.

Generally speaking, intensive (intense) grinding can be performed with any suitable grinding apparatus as long as the parameters in accordance with this present invention are observed. Preferably, intensive grinding is carried out in a wet mill, in particular in a pear mill or annular gap mill. During grinding, a high quantity of energy (approx. 0.5 to 10 kW/l, preferably approx. 1 to 10 kW/l) is applied, and this high quantity of energy also leads, in addition to grinding/mixing, to a chemical reaction, i.e. a solid-particle reaction, assumingly because ions detach from the activated surface. During the final grinding stage, in a preferred embodiment hereof, the energy quantity can be reduced, e.g. to 2 to 5 kW per liter.

Preferably, intensive grinding is performed at a pH value in the range from approx. 7 to 13.5 and at temperatures in the range between approx. 20 to 100° C. During grinding, the temperature increases.

In accordance with the method of this present invention, at least one of the original components, i.e. one compound of the bivalent and/or trivalent metals and/or the mixture of the compounds of the bivalent and/or trivalent metals is subjected to above-mentioned intensive grinding. To the extent that, as a result of the intensive grinding specified for the method in accordance with this present invention, the initial components have already been sufficiently activated for the manufacture of hydrotalcites, in many cases, additional intensive grinding during and/or after mixing the compounds of the bivalent and trivalent metals is no longer required. The same may apply in case only one of the above Components A and B is used as an inactive raw material, in particular in the form of a suspension, whereas the other component is used in the form of a solution.

In a particularly preferred embodiment of the method in accordance with this present invention, as a compound of the bivalent metal (Component A), inactive magnesium oxide is used and subjected to the intensive grinding in accordance with this present invention. In this case, as a compound of the trivalent metal (Component B), aluminum hydroxide can be used which is converted to sodium aluminate by adding sodium hydroxide. Intensive grinding of the sodium aluminate solution is therefore not required. The initially inactive magnesium oxide is transferred, at least partially, to the hydroxide during intensive grinding (wet grinding). Preferably, at this point in time, carbon dioxide is already being supplied as a carbonate source. Afterwards, mixing with the compound of the trivalent metal is carried out, preferably with the above-mentioned sodium aluminate solution.

In case intensive grinding in accordance with a preferred embodiment hereof is carried out during or after mixing the compounds of the bivalent and trivalent metals, such intensive grinding can preferably be continued until an amorphous or crystalline hydrotalcite phase is formed.

Such an intensive grinding of the mixing suspension, which may be performed e.g. for 1 to 3 minutes with 7 kW per liter and/or approx. 10 to 20 minutes at 5 kW per liter, produces new phases: initially an amorphous hydrotalcite phase and, only to a limited extent (e.g. 3 to 4 percent), a crystalline hydrotalcite phase. The amorphous hydrotalcite precursor phase is present with a small granular size. In case the amount of energy supplied is increased, i.e. by extending the duration of grinding, the percentage of the crystalline hydrotalcite phase increases.

It has been found that, to achieve good results, the method in accordance with this present invention requires that a carbonate source be added to the excess. For the purposes hereof, the term "excess" refers to a quantity of >0.5 mol of $CO_2$ and/or carbonate per mol of Al (or trivalent metals used, respectively). The preferred ranges are: >0.5 to 3 mol, in particular 0.8 to 2.5 mol, particularly preferably 1.0 to 2.0 mol of $CO_2$ and/or carbonate/mol of Al or trivalent metals used, respectively. In accordance with this present invention, they are added prior or during mixing of the compounds of the bivalent and trivalent metal, although in all cases prior to any optional hydrothermal post-treatment of the preparation.

Surprisingly, it has been found that the addition of carbon dioxide as a carbonate source produces particularly advantageous results. Alternatively, carbonate may also be supplied by using a carbonate-containing compound of the bivalent and/or trivalent metal or by additionally supplying carbonate-containing salts. However, the addition of $CO_2$ is clearly preferred. By adding $CO_2$, the pH value of the suspension of the raw materials or of the mixing suspension can also be set to and/or maintained at the desired value.

In case, in accordance with one of the embodiments hereof, at least one of the Components A or B is separately activated by means of intensive grinding, this is carried out, in accordance with this present invention, shortly prior to subsequent conversion as per the method herein. This is intended to ensure that the activation achieved through intensive grinding is not lost prior to the conversion as per the method in accordance with this present invention as a result of undesired reactions. Usually, intensive grinding is therefore performed no more than five hours prior to subsequent conversion in accordance with this present invention. It is assumed that the active particle surfaces which were activated during intensive grinding could play a role in this respect.

The solid content of the suspension(s) and/or mixed suspension containing the compounds of the bivalent and trivalent metals that are used is preferably between 30 and 60 percent by weight. Insofar as the apparatuses used for intensive grinding are concerned, these limits have also been found to be practicable; however, on a case-by-case basis, lower or higher solid contents may also be used.

One preferred embodiment of the method for the manufacture of hydrotalcites from compounds of bivalent and trivalent metals is characterized in that (a) separate suspensions of the insoluble carbonates, oxides and/or hydroxides of the bivalent metals and the oxides or hydroxides of the trivalent metals, or (b) a mixed suspension of the components are subjected to intensive grinding until an average particle size (D50) of approx. 1 to 5µ, wherein, in case the oxides or hydroxides of the bivalent and trivalent metals are used, prior, during, or after intensive grinding, a carbonate source is added; in case (a), the separate suspensions are mixed, and wherein, in both cases, intensive grinding continues until an amorphous hydrotalcite phase and/or a hydrotalcite phase which is characterized by a sharp X-ray diffraction diagram is obtained; the resulting product is separated, dried, and optionally calcinated.

Components A and B are preferably mixed at a temperature of approx. 40 to 100° C., in particular at temperatures of approx. 80 to 90° C.

The conversion of the mixture of the compounds of the bivalent and trivalent metals (Components A and B) occurs immediately. As a result, the conversion times prior to thermal or hydrothermal post-processing between 0 and 48 hours are usually sufficient.

In one embodiment of this present invention, the carbonates, oxides, and/or hydroxides of the trivalent metals may be substituted, whether as a whole or in part, by soluble salts (e.g. sodium aluminate).

As compounds of the trivalent metals, preferably, aluminum hydroxide, active forms of aluminum oxide and/or sodium aluminate are used. The latter hydrolyze in the suspension, as a result of which a reaction between the aluminum hydroxide and the carbonate of the bivalent metal occurs. The NaOH which forms in the process is used to adjust the pH value.

In another embodiment of this present invention, insoluble carbonates of the bivalent metals may be manufactured in situ by converting the respective oxides and/or hydroxides with soluble carbonates. Preferably, to at least one of the suspensions, in particular to a mixed suspension of the oxides or hydroxides of the bivalent or trivalent metals, sodium bicarbonate and/or sodium carbonate are added as a carbonate source. As a result, the pH value of the suspension can be set to the desired value. The pH value preferably ranges from approx. 6 to 13.5. Such soluble carbonates or bicarbonates may also be added in case the insoluble carbonates of the bivalent metals are used.

The amorphous hydrotalcite phase and/or the partially crystalline hydrotalcite phase can, as per one embodiment of the method in accordance with this present invention, be subjected to hydrothermal post-treatment and/or a thermal aging process, wherein the product obtained is separated from the suspension, dried, and optionally calcinated.

Hydrothermal post-treatment is generally performed at temperatures between >100 to 200° C. for a period of approx. 1 to 20 hours; such treatment covers a heating phase, a holding phase, and cooling phase. These individual phases are dependent on the size of the system used. Hydrothermal post-treatment further increases the percentage of the crystalline hydrotalcite phase characterize by a sharp X-ray diffraction diagram, whereas the percentage of the amorphous hydrotalcite precursor phase decreases accordingly.

Generally speaking, through the raw materials, a suspension (sludge, slurry) with a content of solid particles of approx. 30 to 60 percent by weight is pumped with a prolonged residence time in the grinding chamber of the mill used. In case a FRYMA-MS-32 annular gap mill is used, the grinding chamber was filled, for example, with a high percentage (up to approx. 70 percent) with grinding elements ($Al_2O_3$, $ZrO_2$, glass spheres). The temperature of the sludge (slurry) is between approx. 20 and 100° C.; the pH value is between approx. 7 and 14. During the grinding process, the viscosity of the sludge (slurry) increases. As the residence time in the grinding chamber increases (=increasing number of pumping runs or lower pumping rate), the particles are finely grounded. In a preferred embodiment hereof, in general, a granular size of approx. 0.5 to 1 μm ($D_{50}$ value, i.e. the particle size of 50 percent of the particles is below the specified value) is achieved.

In case the mixed suspension containing the components A and B is subjected to intensive grinding, the energy that is supplied directly leads to the formation of a mixed phase consisting of an X-ray amorphous and a crystalline hydrotalcite. The latter provides the crystallization nuclei during an optional post-processing through hydrothermal post-treatment. Compared with a prior-art hydrothermal hydrotalcite synthesis, this procedural step produces significantly better results (higher crystallinity, higher yield, shorter duration of synthesis, and improved quality). The preceding intensive grinding process therefore makes it possible, as already mentioned earlier, to optimize the entire process in terms of increased flexibility in the selection of raw materials (cheaper raw materials) and shorter durations of synthesis.

Studies of the X-ray diffraction spectrum show that the percentage of crystalline hydrotalcite in the sludge (slurry) rises as the residence time in the grinding chamber increases. In case the sludge (slurry) in the circuit is pumped through the grinding chamber, grinding makes it possible to directly produce crystalline hydrotalcite without requiring any hydrothermal post-treatment. The grinding process produces particularly good results in case basic carbonates or bicarbonates of the bivalent metals and aluminum hydroxide are used.

Instead of hydrothermal post-treatment or in addition thereto, an aging treatment may also be performed in the temperature range between approx. 90 to 135° C. for a period between 0.1 to 10 hours.

Another aspect of this present invention concerns the hydrotalcites which are obtained through the method described herein which, in particular when used as plastic additives, exhibit unexpected advantages compared with prior-art hydrotalcites.

Figure 2:
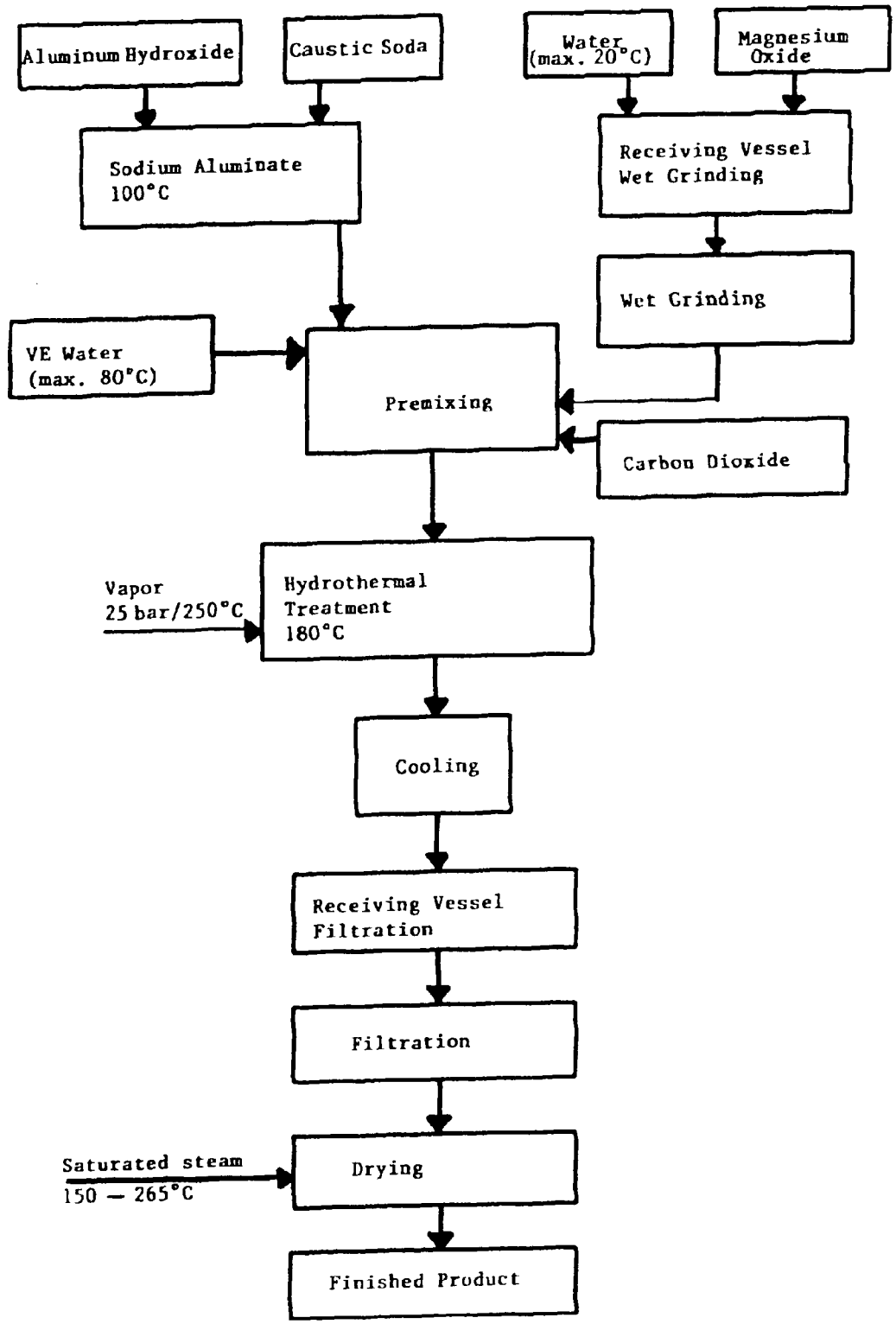

Two embodiments of the method in accordance with this present invention are explained in more detail in the Figures attached hereto:

FIG. 1 shows a procedural schematic of a first embodiment of this present invention, and FIG. 2 shows a procedural schematic of a second embodiment of this present invention.

As shown in FIG. 1, initially, from the raw materials (metal oxides, hydroxides, carbonates) as well as from soda and/or bicarbonate and water, at a pH value of 7 to 14, a sludge (slurry) is prepared which is processed, at a temperature of approx. 20 to 100° C., in annular gap mill (FRYMA MS32). Depending on the grinding level, either predominantly an amorphous hydrotalcite phase with a low percentage of a crystalline hydrotalcite phase (left branch of the procedural schematic) or predominantly the crystalline hydrotalcite phase with a low percentage of the amorphous hydrotalcite phase (right branch of the procedural schematic) is obtained. In the right-hand branch, no hydrothermal post-treatment is performed, and the product is immediately isolated, dried, and calcinated.

In the left-hand branch, the amorphous hydrotalcite phase is subjected to hydrothermal post-treatment, wherein the low percentage of the crystalline hydrotalcite phase provides the crystallization nuclei. Hydrothermal post-treatment generally occurs at temperatures in the range from approx. 100 and 200° C. and with reaction times in the range from approx. 1 to 20 hours. The product obtained is filtered, dried, and optionally calcinated.

As shown in FIG. 2, initially, aluminum hydroxide and sodium hydroxide are used to produce a sodium aluminate solution at an elevated temperature (approx. 100° C.). In a separate container, in cold water (maximum 20° C.), magnesium oxide is suspended. This is followed by intensive grinding in accordance with this present invention (wet grinding). In the process, partial conversion to magnesium hydroxide also takes place. Afterwards, carbon dioxide is added, as a result of which, on one hand, the pH value can be lowered and set to the desired range between pH 9 and pH 11. At the same time, the excessive carbon dioxide supplies the carbonate which is required for the intermediate layers of the hydrotalcite.

After mixing the Na aluminate solution with MgO suspension treated as described above to form a mixed suspension and converting it for approx. 1 hour, conventional hydrothermal treatment may be performed to achieve the desired hydrotalcite crystallite size. Finally, filtering, drying and optionally deagglomeration are carried out.

The hydrotalcites which can be obtained by using the method in accordance with this present invention can either be used as (a) catalysts or catalyst carriers, or (b) as filling agents and co-stabilizers for polymers.

For the first application (a), in particular largely amorphous hydrotalcites which exhibit high surfaces (approx. 60 to 80 $m^2/g$), as determined by BET (DIN 66132), a marked fine particle structure as well as good deformation properties are particularly suited. For this application, however, products obtained through hydrothermal post-treatment are also suitable in case catalysts and/or catalyst carriers with a small surface and larger crystallites are desired.

These catalysts can be used for all reactions where hydrotalcite catalysts are used. By way of example, the synthesis of glycol ethers from olefin oxides (U.S. Pat. No. 5,110,992) and the epoxidation of olefins (U.S. Pat. No. 5,260,495) may be mentioned. Further reactions are specified in Chem. Commun., 1998, pages 295 through 296.

For other reactions, to the hydrotalcites in accordance with this present invention, activation components such as nickel and noble metals, can be added. In this form, the catalysts are suitable for hydrogenations, dehydrogenations, alkylations, etc.

The hydrotalcites which can be obtained in accordance with this present invention are particularly suited for use as filling agents since they can be produced with an entirely white color, which makes it possible to produce entirely white and/or transparent polymeric composite materials. In addition, surprisingly, the hydrotalcites which can be obtained in accordance with this present invention were found to be very easy to incorporate into plastics. For this purpose, however, in individual cases, the amorphous hydrotalcite precursor phase can also be used.

As a polymeric phase for the nanocomposite filling agents which can be used in accordance with this present invention, virtually all technically usable polymer materials are suitable.

The manufacture of the composite materials from the polymer matrix and the finely dispersed nanocomposite filling agents uses methods that are known from prior art. In general, these methods involve the following steps:
a) incorporation of the hydrotalcite into a monomer, oligomer, or polymer, wherein preferably, highly-shearing mixers and dispersing aggregates are used;
b) optional polycondensation, polymerization or thermal and/or chemical crosslinking of the monomers and/or polymers, and
c) subsequent processing of the resulting composite material through pouring, extrusion and/or injection molding.

Suitable polymers include, among others, polyolefins, polyhalogen carbohydrates (e.g. PVC), epoxides, polyesters, acrylates, methacrylates, polyurethanes, polycarbamides, polyamides, polycarbonates, and rubber.

As highly shearing dispersing aggregates, high speed stirring devices, colloid mills, kneading devices, extruders and other dispersing aggregates may be used. Dispersion may occur at room temperature or at elevated temperatures.

The hydrotalcites in accordance with this present invention are also suited as co-stabilizers for polymers, in particular for polyhalogen carbohydrates and olefins. In the former case, they capture the HCl which forms during disintegration. In the latter case, they prevent discolorations resulting from the chain reduction caused by residues of the catalysts that are used in the manufacture of the polyolefins.

Below, this present invention shall be explained in more detail with reference to the following examples:

Initial Preparation:

Intensive grinding was performed by using a FRYMA annular gap mill (spherical filling level 70%, pump setting 2 to 4 l of suspension per minute with an energy input of approx. 7 kW per liter).

First, preliminary tests were conducted with the raw materials ($MgCO_3$, $MgO$, $Al(OH)_2$, basic $ZnCO_3$, $ZnO$) to determine their behavior in the mill and to properly adjust the sludges (slurries) for actual testing (solid content). During the preliminary tests, after three runs (total 9 minutes) through the mill, for the dried powder, an average granular size between 1 and 3 μm (=$D_{50}$ value) was measured. It was furthermore determined that the viscosity of the sludge (slurry) increases significantly; in some cases, it was necessary to dilute the sludge (slurry) with $H_2O$.

Example 1

Intensive Grinding of the Mixed Suspension Containing the Compounds of the Bivalent and Trivalent Metals Upon completion of the tests regarding raw material behavior, five tests were conducted in the annular gap mill (spherical filling level 70%; pump setting 2 to 7 l of suspension per minute; number of runs 5; sampling after the first, third, and fifth run to determine grain size).

The testing parameters are summarized in Table I.

TABLE I

Testing Parameters for the Production of Hydrotalcite

| Test No. | Raw Materials | Qty. [kg] | Sludge (slurry) pH | T (° C.) | Number of Runs | pH Value after Run 1 | Run 2 | Run 3 | Run 4 | Run 5 |
|---|---|---|---|---|---|---|---|---|---|---|
| 1 | MgO | 3.165 | | | | | | | | |
| | Al(OH)$_3$ | 2.925 | | | | | | | | |
| | Soda | 3.06 | 13.1 | | | | | 12.8 | | |
| | H$_2$O | 10 | | RT | 3 | 13.4 | 13.4 | (60° C.) | | |
| | Additional H$_2$O (after 1$^{st}$ Run) | 4 | | | | | | | | |

TABLE I-continued

Testing Parameters for the Production of Hydrotalcite

| Test No. | Raw Materials | Qty. [kg] | Sludge (slurry) pH | T (° C.) | Number of Runs | pH Value after Run 1 | Run 2 | Run 3 | Run 4 | Run 5 |
|---|---|---|---|---|---|---|---|---|---|---|
| 2 | bas. MgCO$_3$ | 7.318 | 10 | RT | 5 | 9 | 9.8 | 10 | 9.4 | 9.4 |
|   | Al(OH)$_3$ | 2.925 | | | | | | | | |
|   | H$_2$O | 30 | | | | | | | | |
|   | Soda solution (17%) | 1 | | | | After Run 1, pH value set to 10 | | | | |
|   | Soda solution (17%) | 0.65 | | | | After Run 1, pH value set to 10 | | | | |
|   | Soda solution (17%) | 0.85 | | | | After Run 1, pH value set to 10 | | | | |
| 3 | MgCO$_3$ | 5.464 | 9.8 | RT | 5 | 8.6 | 9.6 | 9.4 | 9.3 | 9.3 |
|   | ZnCO$_3$ | 2.242 | | | | | | | | |
|   | Al(OH)$_3$ | 2.925 | | | | | | | | |
|   | H$_2$O | 29 | | | | | | | | |
|   | Additional H$_2$O | 2 | | | | After Run 1, pH value set to 10; afterwards, the pH value was no longer adjusted | | | | |
|   | Soda solution (17%) | 1 | | | | | | | | |
| 4 | MgO | 2.363 | | | | | | pH value kept at 13.1 with soda | | |
|   | ZnO | 1.546 | | | | | | | | |
|   | Al(OH)$_3$ | 2.925 | 13.3 | RT | 5 | 13.1 | | | | 13.1 |
|   | Soda | 3.06 | | | | | | | | |
|   | H$_2$O | 10 | | | | | | | | |
|   | Additional H$_2$O | 4 | | | | | | | | |
| 5 | bas. MgCO$_3$ | 7.318 | 8.8 | 56 | 5 | | | | | 8.2 |
|   | Al(OH)$_3$ | 2.925 | | 70 | | | | | | |
|   | H$_2$O | 30 | | after Run 3. | | | | | | |

RT = Room Temperature (20° C.)

The grain size distributions were determined as follows:

A laser diffraction particle size analyzer manufactured by Malvern (Mastersizer) was used which makes it possible to determine the particle size distribution over a range between 0.05 to 900 µm. The device uses the principle of diffraction of light by small particles.

To prepare the specimens, a sample of approx. 50 mg was mixed in a 2 ml cup with approx. 10 ml of ethanol and treated for 5 minutes in an ultrasound finger. The suspension was transferred to the dispersion unit of the device, and ethanol was added until the correct concentration of the samples was displayed by the measuring device. At the end of the measurement, the results were both stored as well as printed out.

The test results (grain sizes $D_{50}$ and $D_{90}$ prior to hydrothermal post-treatment) are summarized in Table II below:

TABLE II

| Test Number | Grain Size Distribution | |
|---|---|---|
| | $D_{50}$ [µ] | $D_{90}$ [µ] |
| 1 | — | — |
| 2 | 0.39 | 1.34 |
| 3 | — | — |
| 4 | 0.25 | 3.28 |
| 5 | 0.4 | 1.82 |

Example 2

Intensive Grinding of the Inactive Raw Material MgO 2 liters of cold (20° C.) water are placed in a working container. In the same, 1667 g of MgO are dispersed by using a Pendraulik stirrer.

Cold water was used to prevent an immediate reaction to Mg(OH)$_2$. The BET surface of the MgO used was 3 m$^2$/g; the solubility product in water is 25° C. (pH 7) is $<1\times10^{-10}$.

The resulting magnesium suspension was performed by using a stirrer ball mill (pearl mill), type Drais PM-1 RL-V) under the following conditions: one run, throughput 125 g per minute; degree of filling of the grinding chamber: 70% with Al$_2$O$_3$ spheres (diameter 1 to 1.5 mm); final washing with 1 liter of washing water; energy uptake of the mill: 0.8 kW; energy input: 2.7 kW per liter).

After intensive grinding, the average particle size was roughly 0.7 µm ($D_{50}$). During heating of the suspension, at least partially, conversion to Mg (OH)$_2$ already occurred. The solid content of the suspension is roughly 30%.

276 g of the ground MgO suspension (Mg content 17.6%) were diluted in 2 l of VE water.

From below, 58.8 g of $CO_2$ were supplied. In the process, the magnesium hydroxide is at least partially converted to magnesium carbonate. Such supply is maintained for a total duration of approx. 2 to 3 hours. In the process, the pH value drops from roughly pH 11 to approx. pH 10.

In a separate container, 70.9 g of aluminum hydroxide are dissolved in 128 g of sodium hydroxide (NaOH content 50%) at 100° C. while forming sodium aluminate.

Afterwards, the magnesium hydroxycarbonate dispersion which was obtained as described above is mixed with the Na aluminate solution while stirring. If necessary, the pH value of the mixed suspension is set to approx. pH 11; the temperature of the mixed suspension is roughly 80° C.

The resulting product can be filtered, washed, and dried by using prior-art methods, e.g. spray drying. Depending on the specific requirements of the hydrotalcite manufactured, a subsequent conventional hydrothermal treatment may also be performed.

The X-ray diffractogram of this product shows a pure hydrotalcite phase.

2. Hydrothermal Post-Treatment 620 g each of the sludges of Example 1 were diluted with 2 liters of water. The mixed suspension of Example 2 as well as the Reference Examples 1 and 2 (see below) were used in non-diluted form. In a stirred autoclave, these mixed suspensions (sludges, slurries) were then continually heated within two hours to 180° C. in a single step, kept at 180° C. for six hours, and cooled down to 80° C. over a period of ten hours. The resulting hydrotalcite crystals were filtered off and dried at 140° C.

The corresponding values for the products after the tests 3 and 4 of Example 1 are shown below: heated to 140° C. over one hour, kept at 140° C. for six hours, and cooled down to 80° C. over a period of ten hours.

The grain size distributions (as specified above) as well as the specific surfaces (as per BET; DIN 66131) as well as the degree of crystallinity, expressed as the ratio between the amorphous and the crystalline hydrotalcite phase as determined by the X-ray diffraction method in accordance with ASTM D 396/85 were determined. The product was analyzed in terms of peak height ($h_2$) and the half-value width of the peak ($b_2$) (003 peak at $2\Theta=11.7\%$) as compared with a standard ($h_2$ and/or $b_2$).

$$\kappa = \frac{h_2 \times b_2}{h_1 \times b_1}$$

The degree of crystallinity K determined in such a manner is specified in Table III, in addition to further properties of the products obtained.

The X-ray diffraction tests showed that, in all tests, depending on the residence time in the annular gap mill, Mg/Al hydrotalcite and/or Mg/Zn/Al hydrotalcite was formed. The percentage of crystalline hydrotalcites goes up as the residence time in the mill increases. Based on the reflex width of the hydrotalcite reflexes, it can be concluded that very small hydrotalcite crystals have formed. After five runs through the mill, the D50 value is between 1.8 and 3.3 µm. The use of basic carbonates of the bivalent metals yielded higher percentages of the crystalline hydrotalcite phase in the product mixture. In case oxides were used, it was necessary to constantly readjust the pH value of the sludge (slurry).

Reference Example 1

In an autoclave, in 2.1 liters of water, 84.8 g of water-free soda were dissolved. The autoclave was closed, and 23.7 g of carbon dioxide were added.

A solution of 406.6 g of $MgCl_2 \cdot 6H_2O$ and 121.2 g of $AlCl_3$ in one liter of water was produced. This solution was then pumped into the autoclave within two hours after carbon dioxide addition.

The suspension was filtered off and washed in a chloride-free manner. Afterwards, the remaining residue was once again charged in 3 liters of water to which, prior thereto, 84.8 g of water-free soda and 23.7 g of carbon dioxide had been added. This suspension was then subjected to the hydrothermal treatment as described above under Item 2.

Reference Example 2

Hydrotalcite synthesis, including hydrothermal post-treatment, was performed as described in Example 2, except that no intensive grinding was performed. In addition, a similar MgO as in Example 2 was used, although with an average particle size of approx. 0.7 µm.

Example 3

Use of the Manufactured Hydrotalcites as a Plastic Additive

In a quick mixer (manufactured by Henschel), the following components were weighed in and intensely mixed up to a temperature of 120° C.:

| | |
|---|---|
| Solvin 271 PC | 2 kg |
| DIDP (stab.) | 1 kg |
| Zinc stearate | 0.1 kg |
| Calcium stearate | 0.2 kg |

This dry blend was used for the subsequent tests after stirring for 24 hours.

110 g of the dry blend and 0.73 g of the hydrotalcite are processed at 180° C. for five minutes on a roller calander to a rolled fabric. The front roller is operated with 15 rpms, the rear roller with 11 rpms. The distance between the rollers is set to 0.4 mm.

From the resulting rolled fabric, 50 mg are cut out and placed in a glass tube. On the top of the tub, a litmus paper is positioned which is used to detected the first traces of HCl which are detached from the PVC. The glass tube is stored in a thermoblock at 200° C. The time until the first occurrence of HCl traces, indicated by the red discoloration of the indicator paper, is determined. This value is referred to as the VDE value.

TABLE III

| Test No. | Grain Distribution $D_{50}$ | Grain Distribution $D_{90}$ | BET [m²/g] | Degree of Cristallinity | VDE [min] |
|---|---|---|---|---|---|
| 1 (Example 1) | 0.8 | 2.1 | 17 | 100% = Standard 1 (Std. 1) | 31 |
| 2 (Example 1) | 0.9 | 3.6 | 15 | 90% (Std. 1) | 28 |
| 3 (Example 1) | 1.1 | 5.2 | 12 | 80% (Std. 2) | 18 |
| 4 (Example 1) | 1.0 | 3.9 | 14 | 100% = Standard 2 (Std. 2) | 35 |
| 5 (Example 1) | 0.8 | 4.2 | 16 | 90% (Std. 1) | 30 |
| Example 2 | 0.65 | 1.2 | 16 | 102% (Std. 1) | 32 |
| Reference Example 1 | 0.82 | 1.4 | 14 | 95% (Std. 1) | 30 |

TABLE III-continued

| Test No. | Grain Distribution $D_{50}$ | $D_{90}$ | BET [m²/g] | Degree of Cristallinity | VDE [min] |
|---|---|---|---|---|---|
| Reference Example 2 | 1.5 | 4.9 | 17 | 70% (Std. 1) | 16 |

The above results clearly show that the method in accordance with this present invention makes it possible to manufacture particularly advantageous hydrotalcites which are even superior to the products manufactured by using the coprecipitation method insofar as the VDE values are concerned.

The invention claimed is:

1. A process for the production of a hydrotalcite product comprising:
   subjecting at least one component selected from the group consisting of bivalent metal compounds (Component A) and trivalent metal compounds (Component B) to grinding until an average particle size, $D_{50}$, of the ground compound is in the range from about 0.1 and 5 µm;
   mixing Component A with Component B to form a suspension; wherein at least one of Components A or B is not used in the form of a solution shortly before or during the mixing of Components A and B and wherein the grinding occurs shortly before or during mixing; and
   separating the hydrotalcite product from the suspension and drying.

2. The process of claim 1, further comprising calcining the hydrotalcite product after separating and drying.

3. The process of claim 1, wherein prior to separating and drying, the hydrotalcite suspension is subjected to a hydrothermal or ageing treatment.

4. The process of claim 1, wherein the grinding continues until the particle size of 90% of the ground compound, ($D_{90}$), is in the range of about 1 to about 5 µm.

5. The process of claim 1, wherein the hydrotalcite product has a phase purity greater than about 90%.

6. The process of claim 1, wherein at least one of Components A or B, when placed in a reaction medium or solvent used to prepare the suspension has a solubility product of less than about $5 \times 10^{-8}$ when measured at 25° C. at a pH of 7.

7. The process of claim 1, wherein Component A is selected from the group consisting of carbonates, hydroxycarbonates, oxides and hydroxides.

8. The process of claim 1, wherein Component B comprises an oxide or a hydroxide.

9. The process of claim 1, further comprising adding a source of carbonate during or after mixing of Component A with Component B.

10. The method of claim 1, wherein the bivalent metal of Component A is selected from the group consisting of $Me^{2+}$, $Ca^{2+}$, $Zn^{2+}$, $Mn^{2+}$, $Co^{2+}$, $Ni^{2+}$, $Fe^{2+}$, $Sr^{2+}$, $Ba^{2+}$ and $Cu^{2+}$.

11. The process of claim 1, wherein the trivalent metal of Component B is selected from the group consisting of $Al^{3+}$, $MN^{3+}$, $Co^{3+}$, $Ni^{3+}$, $Cr^{3+}$, $Fe^{3+}$, $Ga^{3+}$, $Sc^{3+}$, $Ba^{3+}$ and trivalent cations of rare earth metals.

12. The process of claim 1, wherein after mixing the suspension, grinding is continued until the x-ray pattern of hydrotalcite can be identified in a x-ray diffraction diagram.

13. The process of claim 1, wherein Component A and Component B are mixed at a temperature from about 20° C. to about 100° C.

14. The process of claim 1, wherein the trivalent metal compound, Component B, is selected from the group consisting of aluminum hydroxide, aluminum oxide, sodium aluminate and mixtures thereof.

15. The process of claim 1, wherein Component A comprises magnesium oxide in suspension.

16. The process of claim 1, wherein Component B comprises a sodium aluminate solution.

17. The process of claim 1, wherein the grinding is preformed at a pH level in the range from about 7 to about 13.5 and at a temperature from about 20 to about 100° C.

18. The process of claim 3, wherein the hydrothermal treatment is performed at a temperature from about 100 to about 200° C. for about 1 to about 20 hours.

19. A process for the production of a hydrotalcite product, comprising:
   subjecting magnesium oxide to grinding until an average particle size, $D_{50}$, is in the range from about 0.1-5 µm;
   preparing in a separate container a sodium aluminate solution from aluminum hydroxide and sodium hydroxide;
   mixing the sodium aluminate solution with the magnesium oxide to form a hydrotalcite suspension; wherein the grinding of the magnesium oxide occurs shortly before or during the mixing step; and
   separating the hydrotalcite product from the hydrotalcite suspension.

20. The process of claim 19, wherein the magnesium oxide is suspended in cold water before grinding.

21. The process of claim 19, wherein the sodium aluminate solution is prepared at an elevated temperature.

22. The process of claim 20, wherein carbon dioxide is added to the magnesium oxide suspension before or after mixing with the sodium aluminate solution.

23. The process of claim 22, wherein the amount of carbon dioxide added is such that the pH value of the suspension is set to a range between pH 9 and pH 11.

24. The process of claim 20, wherein after mixing the sodium aluminate solution and the magnesium oxide suspension a hydrothermal treatment is performed.

* * * * *